A. N. DAVIS.
ARTIFICIAL TOOTH.
APPLICATION FILED MAY 4, 1920.

1,383,696.

Patented July 5, 1921.
2 SHEETS—SHEET 1.

Inventor
Arthur N. Davis,
By Attorney
C. P. Goepel.

A. N. DAVIS.
ARTIFICIAL TOOTH.
APPLICATION FILED MAY 4, 1920.

1,383,696.

Patented July 5, 1921.
2 SHEETS—SHEET 2.

Inventor
Arthur N. Davis,
By Attorney
C. P. Goepel

UNITED STATES PATENT OFFICE.

ARTHUR N. DAVIS, OF NEW YORK, N. Y.

ARTIFICIAL TOOTH.

1,383,696.   Specification of Letters Patent.   Patented July 5, 1921.

Application filed May 4, 1920. Serial No. 378,723.

*To all whom it may concern:*

Be it known that I, ARTHUR N. DAVIS, a citizen of the United States, and resident of the city of New York, in the county and State of New York, have invented certain new and useful Improvements in Artificial Teeth, of which the following is a description.

This invention relates to improvements in artificial teeth, and more particularly to teeth of that character used in complete sets, crown or bridge work, and, generically considered, contemplates the provision of means whereby the individual teeth may be securely mounted or fixed upon a support of metal, rubber or other moldable composition material.

More particularly the present improvement provides a supplementary means to be used in connection with a tooth of the construction shown and described in Patent No. 1,146,556, granted to me July 13, 1915, whereby the tooth will be securely anchored or immovably fixed upon the support.

In the accomplishment of the above result I propose to provide the walls of the grooves in the tooth shown in the patent above referred to, as well as the posterior surfaces of the tooth, with indentations, projections or other means in or around which the vulcanized moldable material may set and harden, so that the possibility of relative movement between the support and the tooth will be effectually precluded.

The characteristic feature of the present improvement may, in practice, be exemplified in numerous embodiments, certain of which are illustrated in the accompanying drawings. Thus the posterior surfaces of the tooth may be provided with recesses, indentations, grooves, channels, ribs or projections arranged in a variety of ways, and with which the moldable material is adapted to coact.

It is a further general object of my invention to provide an artificial tooth mounting having the improved characteristic noted, and which may, at the same time, be produced in practice, with relatively little manual labor, and at nominal cost.

With the above and other objects in view, my invention consists in the improved construction and relative arrangement of the several parts, as will be hereinafter more fully described and subsequently incorporated in the subjoined claims.

In the drawings, wherein I have disclosed several practical embodiments of the invention, and in which similar reference characters designate corresponding parts throughout the several views.

Figure 1:
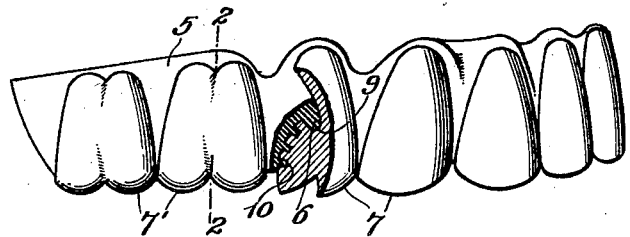
Figure 1 is a side elevation of a plate or support with the teeth thereon, and one of the teeth being partly broken away.
Figure 2:
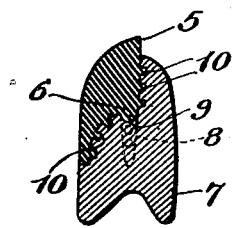
Fig. 2 is a sectional view, taken on the line 2—2 of Fig. 1.
Figure 3:
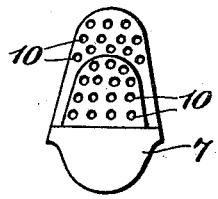
Fig. 3 is a rear elevation of a bicuspid tooth.

Referring in detail to the drawings, and more particularly to Figs. 1, 2 and 3 thereof, 5 designates the plate or support, which may be molded from vulcanized rubber, metal or other composition material. As is well known in the practice of dentistry, this support is produced in conformity to a wax, plaster or composition impression of the mouth of the patient.

Upon the outer face of the support or plate 5, the teeth 7 and 7' are adapted to be securely anchored. The bicuspid, as well as the incisors, cuspid and molar teeth, are provided in their lateral side faces with the tapering grooves or channels 8, as shown in my prior patent above referred to, said grooves or channels at their open ends, being connected by a transverse groove or channel 9. In these channels 8 or 9 the vulcanized rubber of the plate 5 is adapted to set and harden, and constitutes an anchoring rib 6. In addition to this anchoring rib the posterior bearing surfaces of the tooth are provided with auxiliary or supplementary anchoring means, with which portions of the moldable support coact, so as to securely lock the tooth upon the plate in a fixed position, and obviate any possibility of displacement or shifting movement of the tooth relative to the locking rib 6.

As shown in Figs. 1, 2 and 3, this supplementary locking or anchoring means for the tooth consists in the provision of spaced recesses or indentations 10 in the posterior surfaces of the tooth, in which the moldable material of the support 5, when placed under pressure, sets and hardens. Preferably the base walls of the grooves 8 are likewise provided with such spaced indentations, as indicated in Fig. 2 of the drawings. In this manner it will be seen that the tooth is securely anchored upon the support or plate without necessitating the use of metal pins or other equivalent anchoring devices, as heretofore employed. Thus unlike the diatoric tooth the present improvement provides a relatively extensive grinding area, which may be ground down so as to insure a perfect fit of the tooth, and without weakening the tooth structure.

Figure 4:
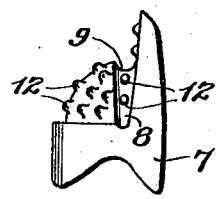
Fig. 4 is a side elevation of the tooth, illustrating a slightly modified construction.

In Fig. 4 of the drawings I have shown an alternative form of the invention, in which instead of providing recesses or indentations 10, the posterior surfaces of the tooth and the walls of the grooves 8 are formed with spaced protuberances 12, when the tooth is cast. In the molding of the plate or support 5 the rubber material sets around these studs or protuberances, and thereby acts to immovably anchor the tooth in a fixed position on the support.

Figure 5:
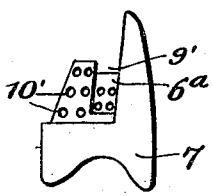
Figs. 5, 6, 7 and 8 are detail elevations illustrating several different forms of the anchoring grooves or channels, and, Fig. 9 is a horizontal sectional view taken on the line 15—15 of Fig. 8.

In Fig. 5 of the drawings I have shown the tooth 7 as provided in its sides with the material receiving grooves or channels 6$^a$, which have parallel side walls, and are connected at their open ends by the transverse channel 9'. Thus it will be understood that this material receiving channel is of uniform width throughout its length. The additional material receiving recesses or indentations 10' are formed in the posterior surface of the tooth and in the base walls of the channels.

Figure 6:
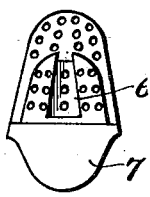
Figure 7:
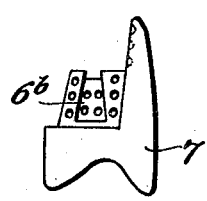

In Fig. 6 I have shown the tooth 7 having a channel 6$^b$ in its lower posterior surface, which tapers in a reverse direction to the side channels 8, as seen in Fig. 4, and in Fig. 7 the similarly tapering channels 6$^b$ are shown in the opposite sides of the tooth. In this case likewise, the posterior surfaces and the base walls of the channels may be provided with the supplementary anchoring means.

Figure 8:
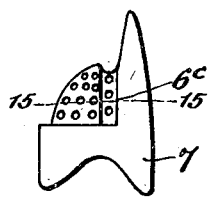
Figure 9:
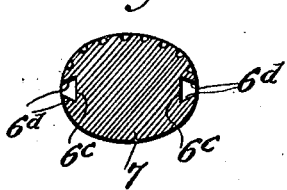

Referring now to Figs. 8 and 9 of the drawings, I have shown therein a tooth having straight, non-tapering side channels 6$^c$, connected by the transverse channel at their open ends, as in Fig. 4, and the side walls of these channels 6$^c$ are undercut, as at 6$^d$, thus providing channels of dove tail form in cross section. This form of the tooth is particularly designed for use in connection with a support or plate of rubber or other similar composition material. The dove tail construction may, however, also be utilized in connection with channels of the tapering form, as shown in Figs. 4 and 6, as well as the channels having parallel side walls. In connection with the dove tail construction, the supplementary anchoring means can be eliminated, if desired.

From the foregoing description, considered in connection with the accompanying drawings, the construction and manner of operation of the several illustrated embodiments of my invention will be clearly understood. Of course, the invention is applicable for use with single teeth on a crown, or with teeth set on a bridge, or with a full set of teeth on a plate, as herein illustrated.

While I have referred to the transverse connecting groove 9 between the side grooves of the tooth, which is a feature of the invention in my prior patent, it is apparent that in so far as the merits of my present improvement are concerned, the groove 9 may be eliminated.

The invention is also susceptible of numerous other modifications in the form, construction and relative arrangement of the several parts, and I, therefore, reserve the privilege of adopting such further alternative constructions as may be fairly embodied within the spirit and scope of the invention as claimed.

I claim:

1. An artificial tooth adapted to be securely mounted upon a support of moldable material, having vertically disposed lateral grooves in the sides thereof, said grooves having the side walls thereof undercut to provide grooves of dove-tail cross section adapted to receive therein the moldable material of a support for rigidly securing the tooth to the support.

2. An artificial tooth having lateral dovetail grooves therein and provided with indentations in the walls of the grooves, said grooves and indentations being adapted to receive a retaining substance molded therein for anchoring and rigidly holding the tooth to the retaining substance.

3. An artificial tooth adapted to be securely mounted upon a support of moldable material, having vertically disposed lateral grooves in the sides thereof, said grooves having the side walls thereof undercut to provide grooves of dove-tail cross section adapted to receive therein the moldable material of a support for rigidly securing the tooth to the support, said tooth having in the body thereof indentations adapted to receive the moldable material of the support therein for anchoring the tooth body on the support.

4. An artificial tooth adapted to be securely mounted upon a support of moldable material, having vertically disposed lateral grooves in the sides thereof, said grooves having the side walls thereof undercut to provide grooves of dovetail cross section and with said side walls converging toward the open end of the grooves to also provide grooves dovetail in side elevation, said double dovetail grooves being adapted to receive therein the moldable material of a support for rigidly securing the tooth to the support.

5. An artificial tooth adapted to be securely mounted upon a support of moldable material, having a relatively smooth mold engaging wall and provided on said wall with a plurality of projections adapted to engage in the moldable material for maintaining the tooth from displacement from said support of moldable material.

In testimony that I claim the foregoing as my invention, I have signed my name hereunder.

ARTHUR N. DAVIS.